(12) United States Patent
Kim

(10) Patent No.: US 8,988,704 B2
(45) Date of Patent: Mar. 24, 2015

(54) IMAGE FORMING APPARATUS AND INPUT METHOD THEREOF

(75) Inventor: Jung-hun Kim, Pohang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 768 days.

(21) Appl. No.: 12/550,560

(22) Filed: Aug. 31, 2009

(65) Prior Publication Data

US 2010/0079794 A1 Apr. 1, 2010

(30) Foreign Application Priority Data

Sep. 26, 2008 (KR) .............................. 2008-0094928

(51) Int. Cl.
*G06F 3/12* (2006.01)
*G06F 3/023* (2006.01)
*G06F 3/0482* (2013.01)
(Continued)

(52) U.S. Cl.
CPC .............. *G06F 3/023* (2013.01); *G06F 3/0482* (2013.01); *G06F 3/04886* (2013.01); *H04N 1/00384* (2013.01); *H04N 1/00395* (2013.01); *H04N 1/00411* (2013.01); *H04N 1/00416* (2013.01); *H04N 1/00421* (2013.01); *H04N 1/00432* (2013.01); *H04N 1/00474* (2013.01); *H04N 1/00482* (2013.01); *H04N 2201/0081* (2013.01); *H04N 2201/0091* (2013.01); *H04N 2201/0093* (2013.01); *H04N 2201/0094* (2013.01)
USPC ......................................... 358/1.15; 345/173

(58) Field of Classification Search
CPC .......... H04N 1/00384; H04N 1/00395; H04N 1/00413; H04N 1/00474; H04N 1/00411; H04N 1/00421

USPC .................. 358/1.15; 345/172, 13, 534, 173; 715/700, 961, 838, 863; 710/14
See application file for complete search history.

(56) References Cited

U.S. PATENT DOCUMENTS 8,180,382 B1 * 5/2012 Graefen ...................... 455/412.1
8,392,851 B2 * 3/2013 Watari et al. .................. 715/838
(Continued)

FOREIGN PATENT DOCUMENTS

JP 02124681 5/1990
JP 2000244688 9/2000
(Continued)

OTHER PUBLICATIONS

English Machine Translation of JP 2007-235336-A (Sakata, Published Sep. 13, 2007).*
(Continued)

*Primary Examiner* — Benny Q Tieu
*Assistant Examiner* — Juan M Guillermety
(74) *Attorney, Agent, or Firm* — Staas & Halsey LLP

(57) ABSTRACT

An image forming apparatus and an input method thereof are provided. The input method of an image forming apparatus which includes at least one hard key and a touch screen, including displaying a screen with at least one input selection option on the touch screen, receiving a selection of the at least one hard key and a touch selection of at least one of the input selection options of the displayed screen, and performing an operation corresponding to the received hard key selection and the received touch selection. Thus, a shortcut key using a hard key and a touch screen together may be provided, thereby reducing inconvenience for a user to navigate to a menu and to input data.

20 Claims, 13 Drawing Sheets

(51) Int. Cl.
*G06F 3/0488* (2013.01)
*H04N 1/00* (2006.01)

(56) References Cited

U.S. PATENT DOCUMENTS

| | | | |
|---|---|---|---|
| 2005/0012723 A1* | 1/2005 | Pallakoff | 345/173 |
| 2008/0239382 A1* | 10/2008 | Matsueda | 358/1.15 |
| 2009/0009803 A1* | 1/2009 | Takeuchi et al. | 358/1.15 |
| 2009/0009806 A1* | 1/2009 | Matsuda | 358/1.15 |
| 2009/0187676 A1* | 7/2009 | Griffin et al. | 710/14 |
| 2009/0235281 A1* | 9/2009 | Lu et al. | 719/318 |
| 2010/0042954 A1* | 2/2010 | Rosenblatt et al. | 715/863 |
| 2010/0070931 A1* | 3/2010 | Nichols | 715/863 |

FOREIGN PATENT DOCUMENTS

| | | |
|---|---|---|
| JP | 2007235336 | 9/2007 |
| KR | 10-2004-0003969 | 1/2004 |

OTHER PUBLICATIONS

Korean Office Action dated Jan. 14, 2013 issued in KR Application No. 10-2008-0094928.

\* cited by examiner

IMAGE FORMING APPARATUS AND INPUT METHOD THEREOF

CROSS-REFERENCE TO RELATED APPLICATIONS

This application claims priority under 35 U.S.C. §119(a) Korean Patent Application No. 10-2008-0094928, filed on Sep. 26, 2008 in the Korean Intellectual Property Office, the disclosure of which is incorporated herein by reference.

BACKGROUND

1. Field of the Invention

An apparatus and a method of the present general inventive concept relate to an image forming apparatus and an input method thereof, and more particularly, to an image forming apparatus receiving data through a hard key and a touch screen provided to the image forming apparatus, and an input method thereof.

2. Description of the Related Art

An image forming apparatus forms an image printed on a paper. The image forming apparatus may be implemented as a printer, an electronic copier, a facsimile, a multifunction device, etc.

The image forming apparatus is provided with a user interface for receiving data or various commands from a user. The user interface may include a hard key (button) representing a function of the image forming apparatus, a number, etc., and a touch screen displayed in a display unit to receive an input by contact with a user.

Typically, the user uses the hard key or the touch screen to input data or a command. For example, if sending a facsimile, the user may move a menu in sequence to select an input window of a receiver facsimile number in the touch screen, and may input the facsimile number by using the number hard key.

Also, if inputting an e-mail address to use a function such as a scan-to-email function of the image forming apparatus, the user may move the menu in sequence to select a virtual keyboard displayed in the display unit by using the touch screen, and may input the e-mail address by using the touch screen in which the virtual keyboard is displayed.

However, in the input method using the hard key or the touch screen, the image forming apparatus is apt to perform screen conversions four or five times in sequence when the touch screen is used to move to a menu which the user wants to use.

Accordingly, the present input processes are troublesome, and the input method using the virtual keyboard causes inconvenience to the user unfamiliar with the touch screen.

SUMMARY

Accordingly, the present general inventive concept provides an image forming apparatus supplying a shortcut key using a hard key and a touch screen together to allow a user to conveniently move to a wanted menu and to input data, and an input method thereof.

Additional aspects and utilities of the present general inventive concept will be set forth in part in the description which follows and, in part, will be obvious from the description, or may be learned by practice of the general inventive concept.

Exemplary embodiments of the present general inventive concept provide an image forming apparatus to display a selectable list and to receive inputted data from a user, and an input method thereof.

Exemplary embodiments of the present general inventive concept is to provide an image forming apparatus to set a shortcut key to perform different operations according to a displayed screen, where various shortcut keys may be set for a predetermined number of hard keys, and an input method thereof.

Exemplary embodiments of the present general inventive concept provide a method of receiving input with an image forming apparatus which includes at least one hard key and a touch screen, the input method of the image forming apparatus including displaying a screen with at least one input selection option on the touch screen, receiving a selection of the at least one hard key and a touch selection of at least one of the input selection options of the displayed screen, and performing an operation corresponding to the received hard key selection and the received touch selection.

The receiving may include receiving the hard key selection and the touch selection simultaneously or between a predetermined time interval, and setting a shortcut key to perform operations of both the received hard key selection and the touch selection.

The method may include the selection of the same hard key to perform different operations according to the displayed input screen.

The touch screen may include an input field set to receive a predetermined data, and the performing the operation may include displaying a selectable list in at least a portion of the input field.

The performing the operation may include displaying a direct moving menu for a predetermined function.

Exemplary embodiments of the present general inventive concept provide an image forming apparatus which includes at least one hard key and a touch screen, the image forming apparatus having a display unit to display a screen having at least one input selection option for an input to the touch screen, a user interface having the hard key and the touch screen of the displayed screen, and a control unit to perform an operation corresponding to a received hard key selection and a received input from the touch screen.

The user interface may simultaneously receive the hard key selection and the input from the touch screen or by a predetermined time interval, and the control unit sets a shortcut key to perform operations of both the received hard key selection and the touch screen selection.

The control unit may perform a different operation that corresponds with the displayed input screen when the same hard key is selected.

The touch screen may include an input field to receive a predetermined data, and the control unit may control the display unit to display a selectable list with respect to the input field if the hard key selection and the input from the touch screen are both received.

The control unit may control the display unit to display a direct moving menu for a selectable predetermined function if the hard key selection and the input from the touch screen are both received.

Exemplary embodiments of the present general inventive concept may also include a method of receiving input with an image forming apparatus that includes at least one hard key and a touch screen, the method including receiving a selection of the at least one hard key and a touch selection of at least one input selection options displayed on the touch screen, and setting a shortcut key to perform operations of both the received hard key selection and the touch selection.

The method may include where one of the at least one hard keys is set as the shortcut key, and the shortcut key performs different functions according to an operation mode of the image forming apparatus.

The operation mode of the method may include a facsimile mode, a scanning mode, a copy mode, a scan-to-e-mail mode, and an e-mail facsimile mode, or any combination thereof.

Exemplary embodiments of the present general inventive concept may also include a computer readable medium including instructions that when executed by a computer perform a method of receiving input with an image forming apparatus that includes at least one hard key and a touch screen, the method including receiving a selection of the at least one hard key and a touch selection of at least one input selection options displayed on the touch screen, and setting a shortcut key to perform operations of both the received hard key selection and the touch selection.

Exemplary embodiments of the present general inventive concept may also include an image forming apparatus having at least one hard key and a touch screen, the image forming apparatus having a display unit to display a screen having at least one input selection option for an input to the touch screen, a user interface having the hard key and the touch screen of the displayed screen, and a control unit to set a shortcut key to perform operations of both a selected hard key and a touch selection from the touch screen of the user interface.

The image forming apparatus may further include where one of the at least one hard keys is set as the shortcut key, and the control unit controls the shortcut key performs different functions according to an operation mode of the image forming apparatus.

The image forming apparatus may further include where the operation mode includes a facsimile mode, a scanning mode, a copy mode, a scan-to-e-mail mode, and an e-mail facsimile mode, or any combination thereof.

Exemplary embodiments of the present general inventive concept may also include an image forming apparatus having at least one hard key and a touch screen, the image forming apparatus including a display unit to display a screen having at least one input selection option for an input to the touch screen, and a control unit to set a shortcut key to perform operations of both a selected hard key and a touch selection from the touch screen.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
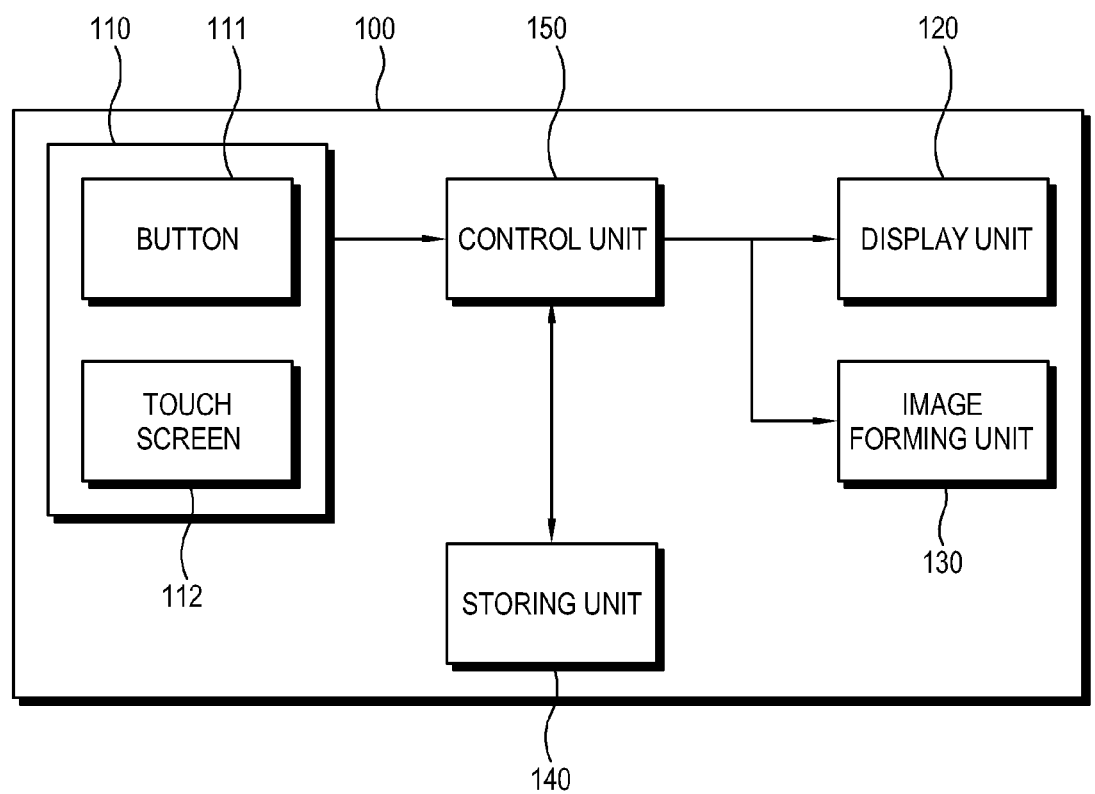
FIG. 1 is a block diagram illustrating a configuration of an image forming apparatus according to exemplary embodiments of the present general inventive concept.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures. Repetitive description with respect to like elements of different embodiments may be omitted for the convenience of clarity.

FIG. 1 is a block diagram illustrating a configuration of an image forming apparatus 100 according to exemplary embodiments of the present general inventive concept. The image forming apparatus 100 according to the exemplary embodiments of the present general inventive concept may be implemented as a printer, an electronic copier, a facsimile, a multifunction device having equal to or more than two functions, etc.

The image forming apparatus 100 according to the exemplary embodiments of the present general inventive concept performs printing according to a printing data on at least one printing medium, such as paper or any other suitable printing medium. The image forming apparatus 100 may print a copy of a document after scanning the document, received facsimile data, and/or printing data received from an outside through a host apparatus including a server or stored in an internal part (e.g., hard disk drive) or an external part (e.g., universal serial bus memory) of the image forming apparatus 100.

As illustrated in FIG. 1, the image forming apparatus 100 includes a user interface 110, a display unit 120, an image forming unit 130, a storing unit 140 and a control unit 150.

The user interface 110 receives data, a command, an input selection, or any other suitable input from a user. The user interface 110 includes a hard key 111 (which may be referred to hereinafter also as a 'key button', 'button' or 'key pad') of the image forming apparatus 100, and a touch screen 112 (which may be referred to hereinafter as a 'touch panel' or 'touch pad') displayed in the display unit 120 to receive touch input from the user. The touch screen 112 may include a graphic user interface (GUI) generated by a printer driver or execution of a separate application to be displayed in the display unit 120 in a screen to receive touch input from the user.

The user interface 110 of the image forming apparatus 100 according to present exemplary embodiments supplies a shortcut key (which hereinafter may also be referred to as a 'hot key') using the hard key 111 and the touch screen 112 together. If the control unit 150 receives a mixed input of both a hard key selection of the hard key 111 and a touch input from the touch screen 112, the control unit 150 performs a predetermined operation according to the received mixed input. That is, the shortcut key, when set, may perform the operations previously performed by selecting the hard key 111 and an input selection option from the touch screen 112.

The received mixed input of the hard key selection and the touch input from the touch screen may include that the hard key selection and the touch input are mixed when both are received during a predetermined time interval, and may also include when the one of the hard key selection and the touch input are received simultaneously with one another. That is, a shortcut key may be set to perform one or more operations that are typically performed by the image forming apparatus 100 when a hard key 111 and a touch selection from the touch screen 112 are received simultaneously or within a predetermined period of time from one another.

The display unit 120 may display setting information and an operation state of the image forming apparatus 100, and may display a GUI screen including the touch screen for receiving a touch input from a user. The display unit 120 displays the touch screen (e.g., touch screen 112) corresponding to an operation mode (for example, a facsimile mode, a scanning mode, a copy mode, a scan-to-e-mail mode, an e-mail facsimile mode, etc.) of the image forming apparatus 100. For example, different operation modes may have one or more different selection options in the touch screens displayed in the display unit 120. The display unit 120 may include a thin film transistor-liquid crystal display (TFT-LCD) (not illustrated), and a driving unit (not illustrated) driving the TFT-LCD.

The image forming unit 130 generates an image printed on a printing medium using printing data when a printing command is received by the image forming apparatus 100.

The storing unit 140 stores various data. For example, the stored data may include printing data, touch screen data, driver data for the image forming apparatus 100, or any other suitable data. Also, if a shortcut key that includes the sequence of the selection of the hard key 111 and an input selection option of the touch screen 112 together is set, the storing unit 140 stores setting information for the shortcut key. The image forming apparatus 100 performs an operation corresponding to the setting information stored in the storing unit 140 if the hard key selection and the touch are mixed to be input. That is, upon selection of a shortcut key, the image forming apparatus 100 performs an operation as if the selection of the hard key 111 and touch input of an input selection option on the touch screen 112 have been received. The storing unit 140 may be an internal storage medium such as a hard disk drive (HDD), or a portable storage medium such as a universal serial bus (USB) memory and a memory card (e.g., a memory stick, a compact flash (CF) card, a multi media card (MMC) or the like), any other suitable digital storage device, or any combination thereof.

The control unit 150 controls the image forming apparatus 100. For example, the control unit 150 may control the display unit 120 to display the touch screen for input. If a mixed input of a hard key selection through the hard key 111 and a touch against the touch screen 112 is received, the control unit 150 performs an operation corresponding to the received hard key and touch input. If a selection of a shortcut key is received, the control unit 150 may control the image forming apparatus 100 to perform one or more operations as if the selection of the hard key 111 and touch input of an input selection option on the touch screen 112 have been received. The control unit 150 may also control storing data and retrieving data from the storing unit 140 (e.g., printing data, touch screen data, driver data for the image forming apparatus 100, shortkey day, operation data, etc.). The control unit 150 may also control the image forming unit 130, which may form an image using data received from the storage unit 140, control unit 150, or other data source to form an image on a printing medium.

FIGS. 2A to 4B illustrate display screens for a shortcut key using a hard key input and a touch input together according to exemplary embodiments of the present general inventive concept.

The control unit 150 may perform an operation that corresponds to a displayed input screen with respect to a selected hard key input. That is, the image forming apparatus 100 may be set to configure different shortcut keys with respect to the same hard key, depending on the operation mode. For example, when the image forming apparatus 100 is in a first operation mode, a hard key may be set as a shortcut key to perform a first operation when selected. When the image forming apparatus 100 is in a second mode of operation, the hard key may be set as a shortcut key to perform a second operation when selected. In another example, when the image forming apparatus 100 is in a particular mode of operation, a hard key set to function as a shortcut key may be set to includes both an input selection from the touch screen and a hard key selection, where the image forming apparatus may perform and operation when the shortcut key is selected. When the image forming apparatus is in another mode of operation, the hard key set as a shortcut key may perform a set combination of both an input selection from the touch screen and a hard key selection.

The touch screen 112 may include an input field set to receive predetermined data (e.g., from storing unit 140). If an input received from a user combines a specific hard key selection and a touch selection of at least one input selection option of an input field of a touch screen, the control unit 150 may control the display unit 120 to display a selectable list with respect to the corresponding input field.

Figure 2A:
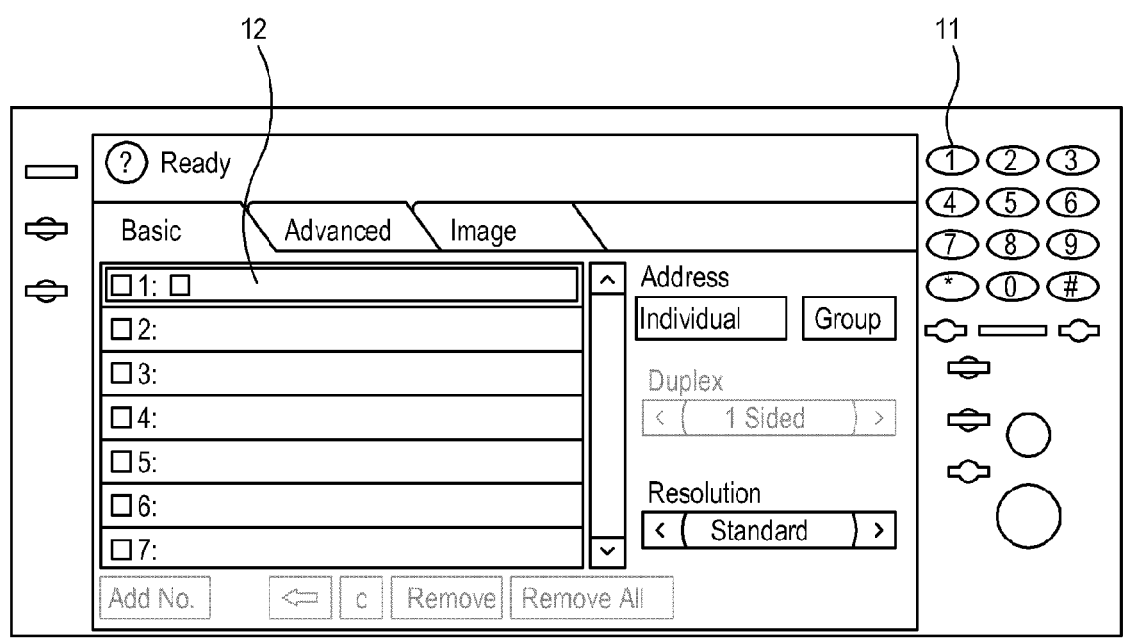
FIGS. 2A to 4B illustrate display screens having a shortcut key that mixes a hard key input and a touch input according to exemplary embodiments of the present general inventive concept.
Figure 2B:
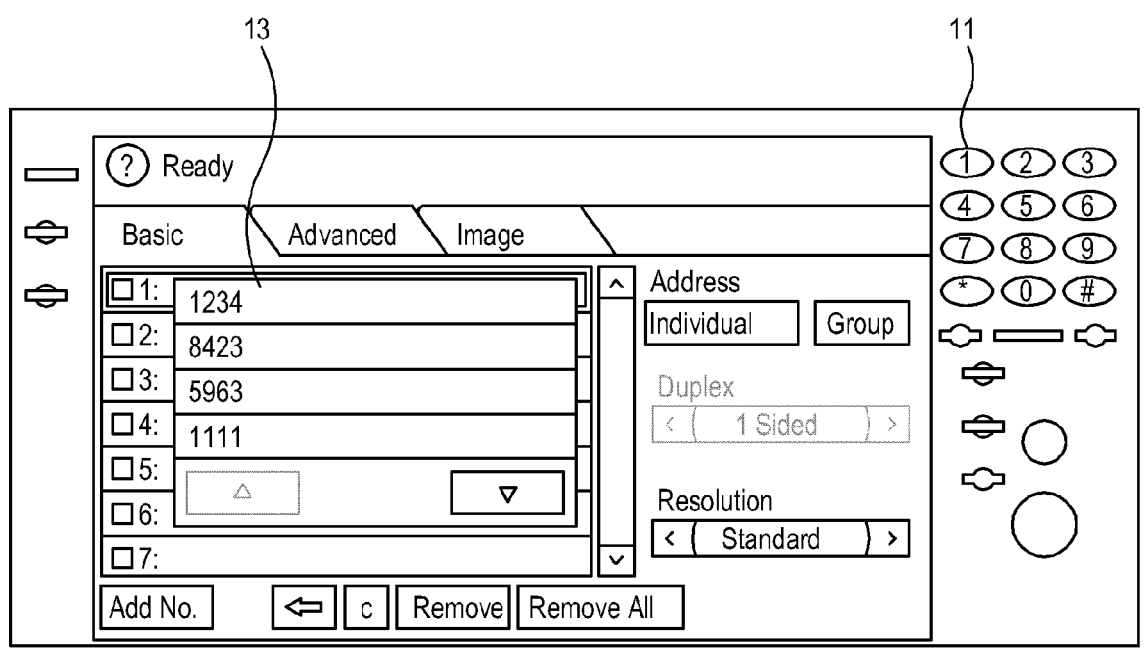

FIGS. 2A and 2B illustrate a touch input that is mixed with a predetermined hard key input that are received in a facsimile mode of the image forming apparatus 100.

As illustrated in FIG. 2A, if the image forming apparatus 100 is the facsimile mode, and if a selection of number hard key 11 and a touch input with respect to a receiver telephone number input field 12 are received together (e.g., the selections are received simultaneously or within a predetermined period of time from one another, or are received according to a selection of a shortcut key that includes these selections), the control unit 150 controls the display unit 120 to output a selectable list 13 of telephone numbers as illustrated in FIG. 2B. The control unit 150 may receive an input touch selection of a telephone number from the displayed telephone number list 13.

The selectable list 13 displayed in FIG. 2B may be a list of one or more telephone numbers that a user has transmitted a facsimile to, or one or more telephone numbers that the user has input via an address book setting or a shortcut key setting. The address book settings and/or shortkey settings may be stored in, for example, the storing unit 140, and may be retrieved by the control unit 150 illustrated in FIG. 1.

Figure 3A:
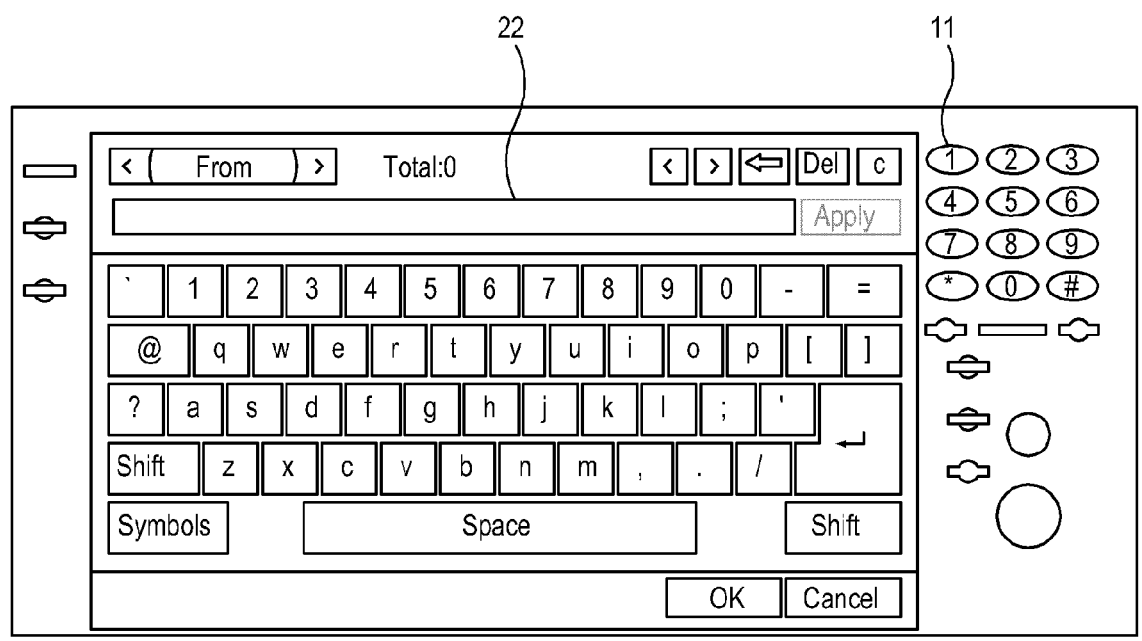
Figure 3B:
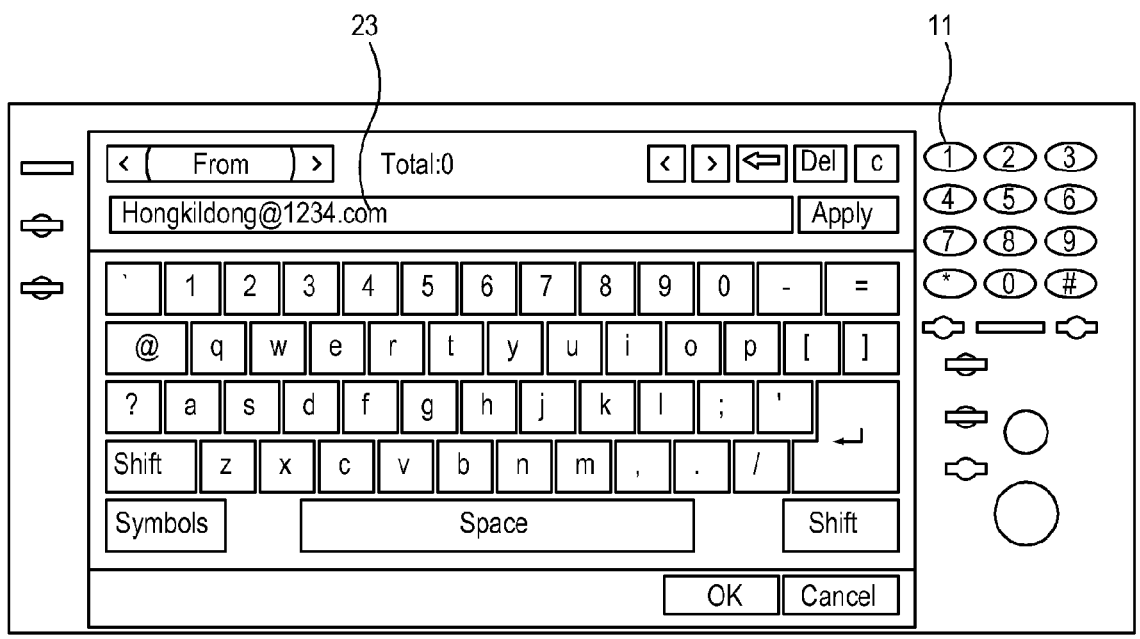

FIGS. 3A and 3B illustrate exemplary embodiments when a predetermined hard key input and touch input are received and mixed in the scan-to-e-mail mode.

As illustrated in FIG. 3A, if the image forming apparatus 100 is in the scan-to-e-mail mode, and if a hard key input with respect to the number hard key '1' 11 and a touch input according to a transmitter e-mail input field 22 are received (e.g., either simultaneously or within a predetermined period of time) and mixed, the control unit 150 automatically receives a transmitter e-mail address 23 as illustrated in FIG. 3B.

The e-mail address 23 input in FIG. 3B may be data which the user has input to transmit an e-mail, or an e-mail address which the user has input by an e-mail environment setting or a shortcut key setting. Alternatively, the user may select e-mail addresses from an address book stored, for example, in storing unit 140.

Referring to FIGS. 2B and 3B, although the same number hard key '1' is selected in the image forming apparatus 100, different operations may be performed depending on a displayed input screen, and the operation mode. That is, the image forming apparatus 100 may have one or more operating modes which may be selected by a user, and corresponding displays according to the selected operating mode may be displayed on the display unit 120 illustrated in FIG. 1.

Accordingly, the user may select a shortcut key to respectively perform different operations, depending on the input screen of the touch screen 112 and the hard key 111 input, as well as the operating mode of the image forming apparatus 100, thereby setting various selectable shortcut keys with the predetermined number of hard keys 112.

Figure 4A:
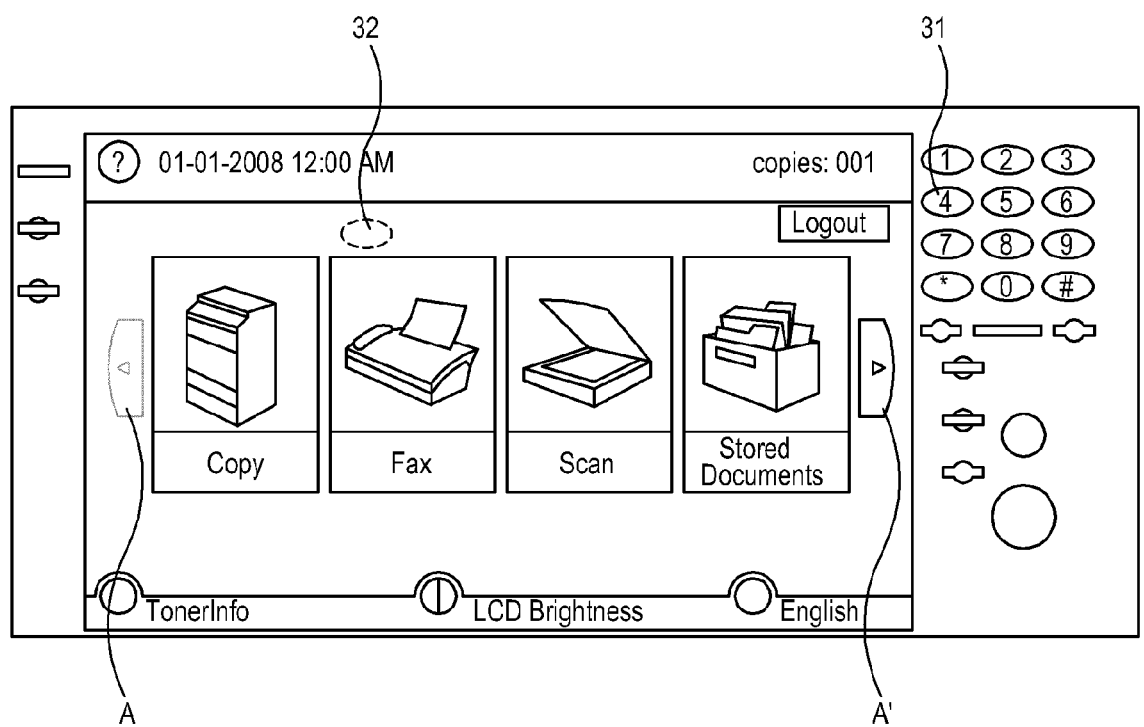
Figure 4B:
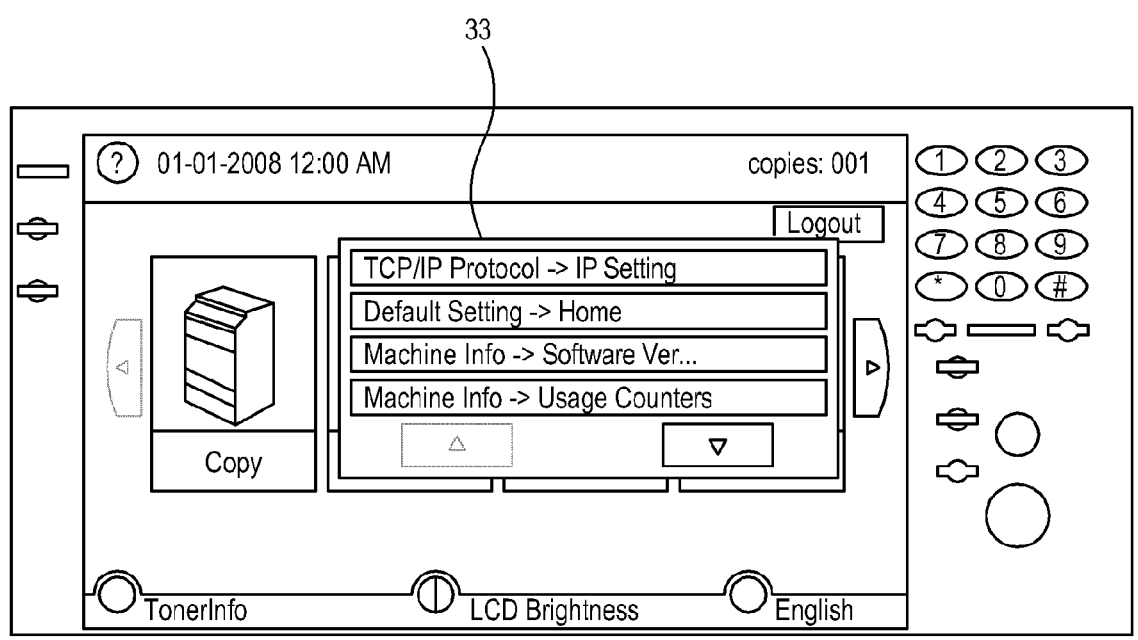

FIGS. 4A and 4B illustrate exemplary embodiments of an initial display screen where predetermined hard key input and touch input that are received are mixed together.

As illustrated in FIG. 4A, in an initial screen state, if a hard key input is received, such as a number hard key '4' 31, and a touch input with respect to a background area 32, are received together (e.g., either simultaneously or within a predetermined period of time from one another), the control unit 150 may display a direct moving menu 33 that provides an option for a predetermined function (or, e.g., favorites or a bookmark) that can be selected as illustrated in FIG. 4B. The predetermined function may include, for example, a copy function, a fax function, a scan function, or a stored documents option, or any other suitable function or option. The user may select arrow A or A' illustrated in FIG. 4A to scroll the displayed functions, and the user may select a function (e.g., a copy function, a fax function, a scan function, etc.) to perform an operation related to the selected function. As illustrated in FIG. 4B, a selected function (e.g., a copy function, etc.) may display the direct moving menu 33 that contains one or more selectable options that corresponds to the selected function (e.g., a copy function, etc.).

The direct moving menu 33 displayed in FIG. 4B may be a list displayed in a using frequency order with respect to a menu which the user has used, a list of a menu which the user registers in advance (and that may be stored in and retrieved from e.g., storing unit 140 illustrated in FIG. 1), or a list of one or more selectable options that correspond to a selected function (e.g., a copy function, a fax function, a scan function, etc.), or any combination thereof.

FIGS. 5A to 5E illustrate screens of a shortcut key that mixes a hard key input and a touch input according to the exemplary embodiments of the present general inventive concept.

Figure 5A:
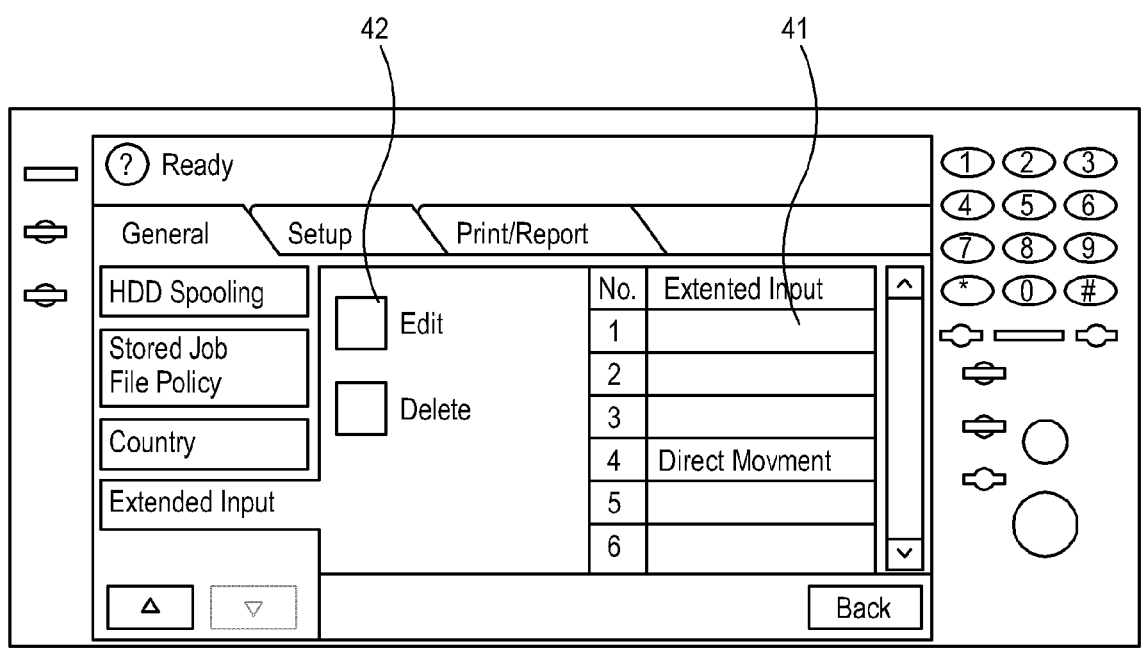
FIGS. 5A to 5E illustrate display screens having a shortcut key that mixes a hard key input and a touch input according to the exemplary embodiments of the present general inventive concept.
Figure 5B:
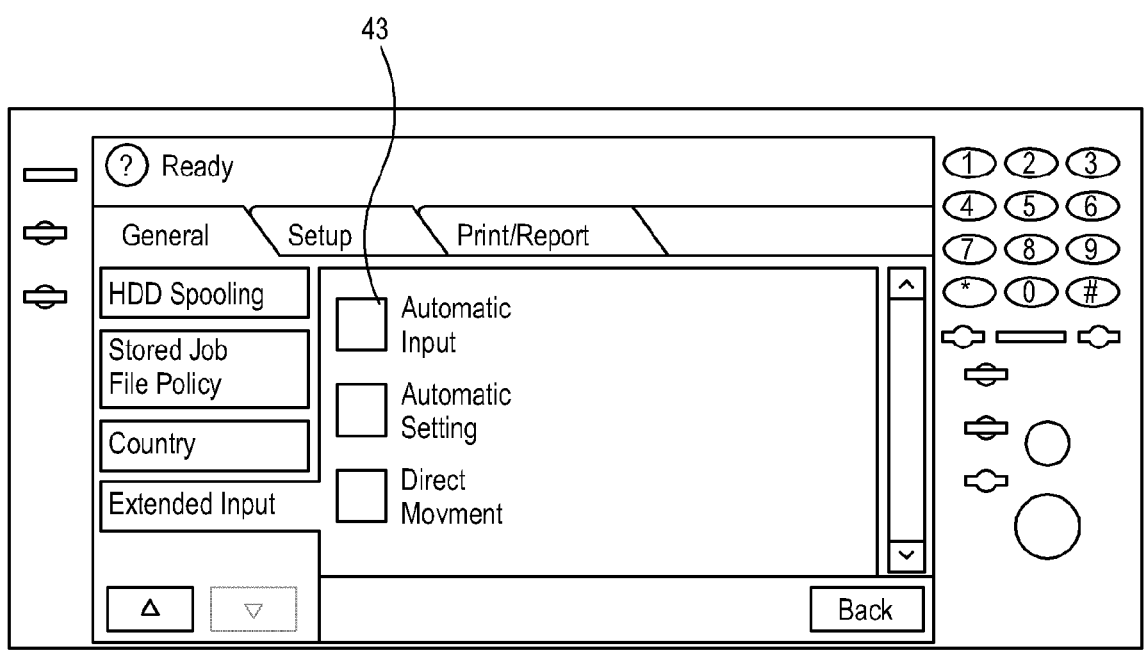

To set an expanded input that mixes a hard key input and a touch input to form a shortcut key, as illustrated in FIG. 5A, the user may select a hard key that may become a shortcut key in an expanded input field of an administrator mode, that is, a number 1 hard key field 41. When the number 1 hard key is selected or for a predetermined period of time after the number 1 hard key is selected, if an input from a touch screen corresponding to an edit 42 is received, a menu may be displayed as illustrated in FIG. 5B. The displayed menu may provide one or more selectable options for setting an expanded input (e.g., automatic input, automatic setting, direct movement, etc.).

Figure 5C:
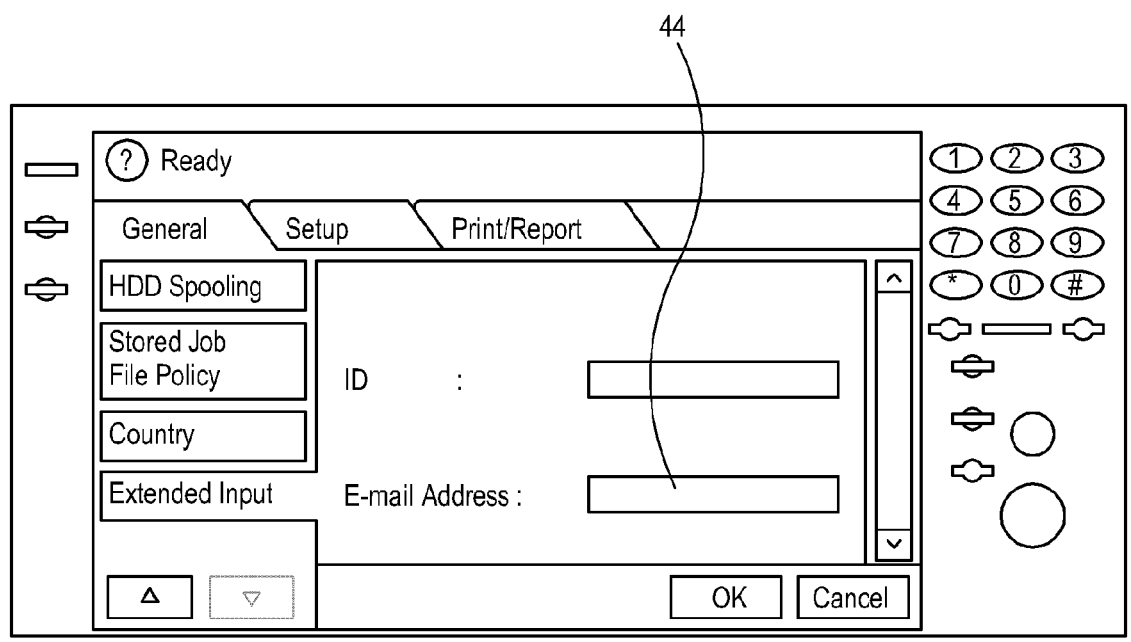

If the user selects an automatic input 43 function as illustrated in FIG. 5B, the display unit 120 displays an input field that corresponds to the automatic input function that includes, for example, an identification code (ID) or an e-mail address as illustrated in FIG. 5C.

Figure 5D:
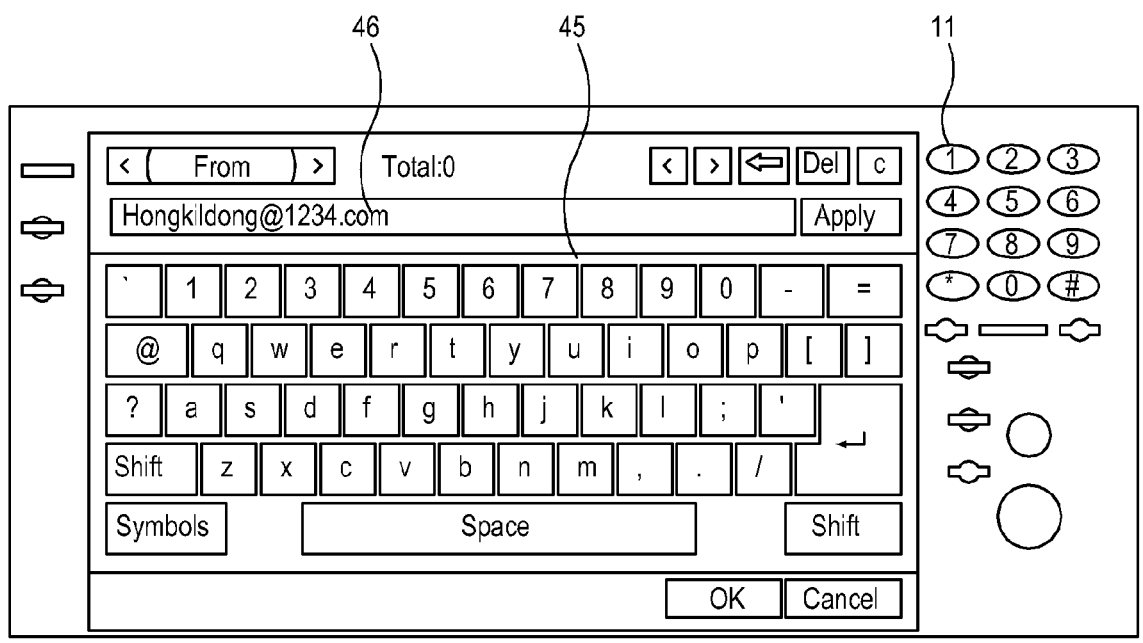

Accordingly, if the user selects an e-mail address input field 44 through which a shortcut key is to be set with respect to the number 1 hard key field 41 as illustrated in FIG. 3C, a virtual keyboard 45 (e.g., as illustrated in FIG. 5D) may be displayed to receive input from the user of an e-mail address. The control unit 150 may receive an e-mail address 46 as input that is entered by a user with the virtual keyboard 45. The input e-mail address 46 may be stored in the storing unit 140.

Figure 5E:
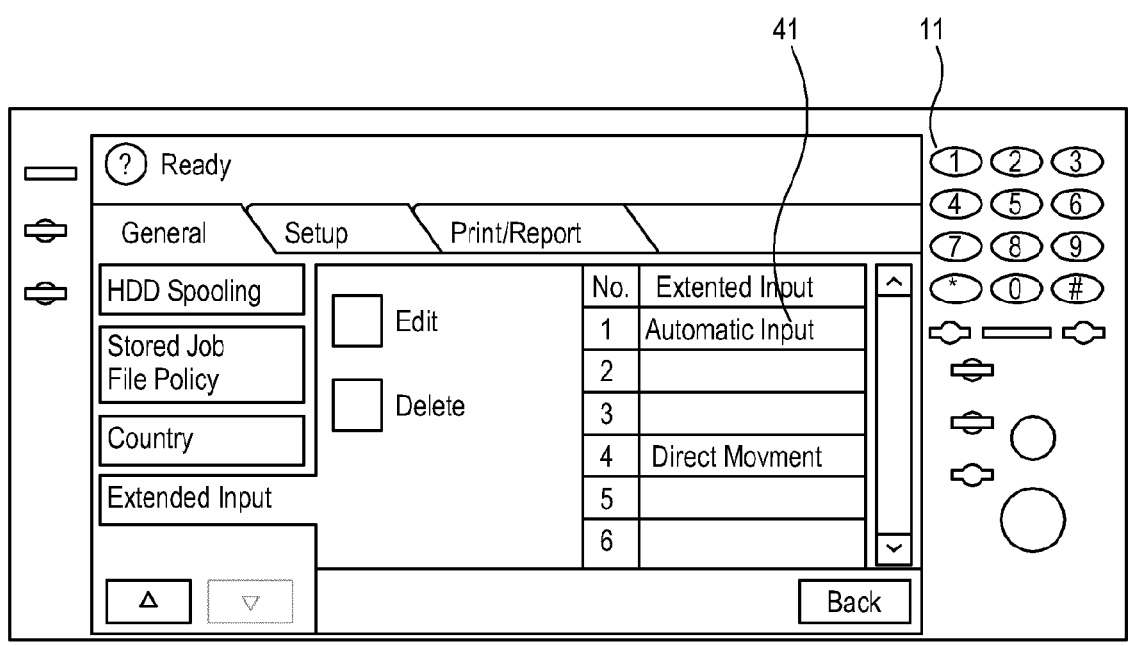

If the e-mail address 46 illustrated in FIG. 5D is input, confirmation is provided that the automatic input function is set to the number 1 hard key field 41 as illustrated in FIG. 5E. That is, the hard key field 41 illustrates that the automatic input is assigned to the number 1 hard key.

If the automatic input for the transmitter e-mail address with respect to the number 1 hard key 11 in the scan-to-e-mail mode is set according to the setting illustrated in FIGS. 5A to 5E, and if an input of the number 1 hard key 11 and a touch input of the e-mail address input field 22 are mixed to be received as illustrated in FIGS. 3A and 3B, the shortcut key may be selected so that the e-mail address 46 (e.g., which may be set in advance) can be input.

Accordingly, when data is received using the virtual keyboard (e.g., virtual keyboard 45 illustrated in FIG. 5D), the image forming apparatus 100 according to the present exemplary embodiments can input and store data. That is, data may be entered using the virtual keyboard 45 and stored, for example, in storing unit 140 illustrated in FIG. 1. Using the stored input data for a shortcut key, a user may select a shortcut key to access the stored data and to perform a function using at least a portion of the data.

As described above and illustrated in related figures, a shortcut key may be set using the hard key input and a received touch input from the touch input together in the scan-to-e-mail mode of the image forming apparatus. The present general inventive concept is not limited thereto, and one or more shortcut keys may be set for various modes of the image forming apparatus 100 such as facsimile, copy, etc.

Figure 6:
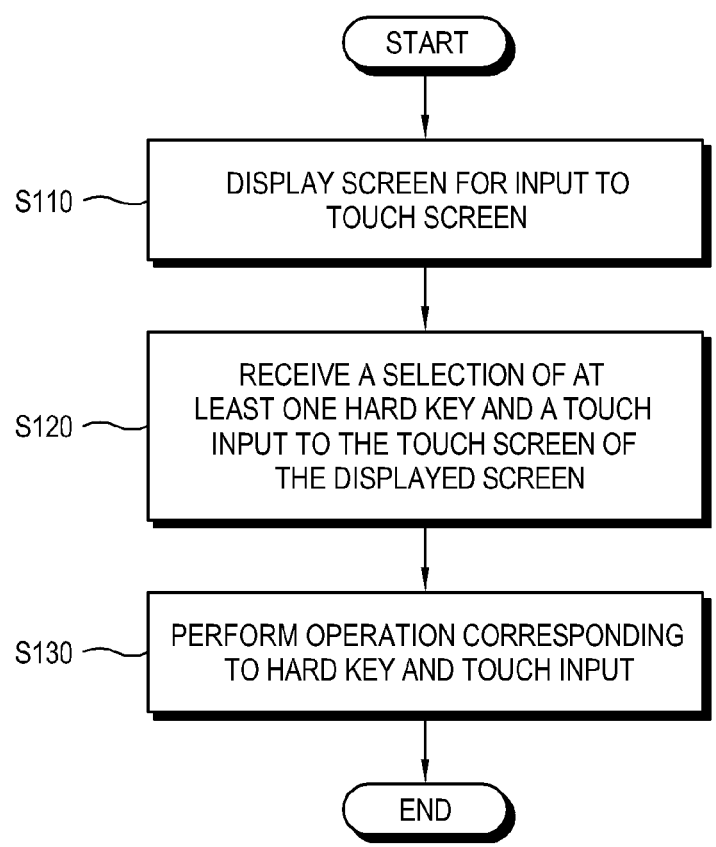
FIG. 6 is a flowchart illustrating an input method of an image forming apparatus according to exemplary embodiments of the present general inventive concept.

Hereinafter, an exemplary input method using the image forming apparatus 100 will be described by referring to FIG. 6.

The image forming apparatus 100 may display a screen providing one or more options that may be selected by touch input received from a touch screen (operation S110).

An input selection of at least one hard key provided to the image forming apparatus 100, and a touch selection of at least one input selection option from the touch screen displayed in the operation S110 may be received and mixed at operation S120.

At operation S130, the control unit 150 may perform an operation corresponding to the hard key and touch input in the operation S120. The control unit 150 may perform an operation corresponding to the received touch selection from the input selection options of the touch screen displayed in the operation S110. That is, the operation mode of the image forming apparatus 100 may correspond to the one or more selectable options in the touch screen displayed in the operation S110, and the control unit 150 may perform different operations according to the selection of the same hard key in different modes of the image forming apparatus 100. For example, a facsimile number list may be displayed in the facsimile mode, and an e-mail address may be automatically input in the scan to e-mail mode.

The touch screen in the operation S110 includes an input field to receive a predetermined data (for example, a facsimile number, an e-mail address, etc.), and a selectable list (for example, a facsimile number list) for the input field may be displayed at operation S130. The displayed list may include data input by a user at operation S130.

Also, at operation S130, a selectable direct moving menu for a predetermined function may be displayed, where the displayed direct moving menu may include a menu that a user registers in advance (e.g., a menu data may provided by the user as input to the image forming apparatus 100 and stored in storing unit 140).

Accordingly, the image forming apparatus 100 according to the exemplary embodiments includes a shortcut key that mixes the received hard key input and the touch input from the touch screen, thereby minimizing the inconvenience to a user to navigate to a specific menu to perform one or more operations and/or functions.

The shortcut key according to the exemplary embodiment of the present general inventive concept may be applied to a favorites menu, a data automatic input (automatic completion), etc., and may further improve and increase security as two inputs together may be used as a password.

As described above, an image forming apparatus and an input method thereof according to the present general inventive concept provides a shortcut key using a hard key and a touch screen together, thereby providing reducing the time and inconvenience for a user to move to a desired menu and to input data.

In the exemplary embodiments of the present general inventive concept described above, a selectable list may displayed and supplied to a user in inputting data, thereby increasing the convenience of operating the image forming apparatus for the user.

Also, a shortcut key to perform different operations depending on a screen and an operation mode of the image forming apparatus with respect to the same hard key input may be set, thereby providing the setting of various shortcut keys with a predetermined number of hard keys.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A method of operating an image forming apparatus, the method comprising:
   displaying a screen image for a touch screen, the displayed screen image providing at least one option selectable by a touch input made through the touch screen;
   receiving a mixed input of both the touch input and a hard key input from a hard key; and performing an operation corresponding to the mixed input,
   setting the hard key of the mixed input as a shortcut key, to perform operations corresponding to both the touch input and the hard key input, with the operation being performed by displaying a direct moving menu for a predetermined function based on the touch input and the hard key input of the mixed input.

2. The method according to claim 1, wherein the mixed input is received when the touch input occurs within a predetermined period of time with respect to the hard key input.

3. The method according to claim 1, wherein the screen image comprises an input field configured to receive predetermined data, and the operation is performed by displaying a selectable list with respect to the input field.

4. The method according to claim 1, wherein the hard key of the mixed input is selected from a plurality of hard keys, and the operation corresponding to the selected hard key is determined according to an operation mode of the image forming apparatus.

5. The method according to claim 4, wherein the operation corresponding to the selected hard key is further determined according to the displayed screen image.

6. The method according to claim 1, wherein the receiving a mixed input comprises receiving a first command signal corresponding to the hard key input and a second command signal corresponding to the touch input, and the operation corresponding to the mixed input is performed only if both the first and second command signals are received.

7. A method of operating an image forming apparatus, the method comprising:
   displaying a screen image for a touch screen, the displayed screen image providing at least one option selectable by a touch input made through the touch screen;
   receiving a mixed input of both the touch input and a hard key input from a hard key; and
   setting the hard key of the mixed input as a shortcut key, to perform operations corresponding to both the touch input and the hard key input, where the shortcut key is set according to an operation mode of the image forming apparatus to perform a mode-specific function for at least two modes.

8. The method according to claim 7, wherein at least two modes are selected from among a facsimile mode, a scanning mode, a copy mode, a scan-to-e-mail mode, and an e-mail facsimile mode.

9. The method according to claim 8, wherein the screen image of the touch screen is displayed according to the operation mode of the image forming apparatus, and the at least one option of the displayed screen image includes a mode-specific option.

10. An image forming apparatus, comprising:
    a display unit configured to display a screen image for a touch screen, the displayed screen image providing at least one option selectable by a touch input made through the touch screen;
    an input unit configured to receive a mixed input of both the touch input and a hard key input from a hard key; and
    a control unit configured to perform an operation corresponding to the mixed input,
    wherein the control unit is further configured to set the hard key of the mixed input as a shortcut key, to perform operations corresponding to both the touch input and the hard key input,
    the control unit is further being configured to control the display unit to display a direct moving menu for a predetermined function based on the touch input and the hard key input of the mixed input.

11. The image forming apparatus according to claim 10, wherein the mixed input is received when the touch input occurs within a predetermined period of time with respect to the hard key input.

12. The image forming apparatus according to claim 10, wherein the screen image comprises an input field configured to receive predetermined data, and the operation is performed by controlling the display unit to display a selectable list with respect to the input field.

13. The image forming apparatus according to claim 10, wherein the input unit includes a plurality of hard keys, the hard key of the mixed input is selected from the plurality of hard keys, and the operation corresponding to the selected hard key is determined according to an operation mode of the image forming apparatus.

14. The image forming apparatus according to claim 13, wherein the operation corresponding to the selected hard key is further determined according to the displayed screen image.

15. The image forming apparatus according to claim 10, wherein the control unit is further configured to receive from the input unit a first command signal corresponding to the hard key input and a second command signal corresponding to the touch input and to perform the operation corresponding to the mixed input only if both the first and second command signals are received.

16. The image forming apparatus according to claim 15, wherein the control unit is further configured to interpret the second command signal based on the first command signal.

17. The image forming apparatus according to claim 15, wherein the control unit is further configured to determine that the second command signal is included in the mixed input if the second command signal is received within a predetermined period of time with respect to reception of the first command signal.

18. An image forming apparatus, comprising:
a display unit configured to display a screen image for a touch screen, the displayed screen image providing at least one option selectable by a touch input made through the touch screen;
an input unit configured to receive a mixed input of both the touch input and a hard key input from a hard key; and
a control unit configured to set the hard key of the mixed input as a shortcut key, to perform operations corresponding to both the touch input and the hard key input, where the shortcut key is set according to an operation mode of the image forming apparatus to perform a mode-specific function for at least two modes.

19. The image forming apparatus according to claim 18, wherein the control unit performs a mode-specific function for at least two modes among a facsimile mode, a scanning mode, a copy mode, a scan-to-e-mail mode, and an e-mail facsimile mode.

20. The image forming apparatus according to claim 19, wherein the screen image of the touch screen is displayed according to the operation mode of the image forming apparatus, and the at least one option of the displayed screen image includes a mode-specific option.

* * * * *